(12) United States Patent
Kratschmer et al.

(10) Patent No.: US 6,740,730 B1
(45) Date of Patent: May 25, 2004

(54) POLYCARBONATE AND MOLDED POLYCARBONATE ARTICLES

(75) Inventors: Silke Kratschmer, Krefeld (DE); Uwe Hucks, Alpen (DE); Lothar Bunzel, Kempen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 123 days.

(21) Appl. No.: 10/031,502

(22) PCT Filed: Jul. 6, 2000

(86) PCT No.: PCT/EP00/06377

§ 371 (c)(1),
(2), (4) Date: Jan. 15, 2002

(87) PCT Pub. No.: WO01/05867

PCT Pub. Date: Jan. 25, 2001

(30) Foreign Application Priority Data

Jul. 19, 1999 (DE) .......................................... 199 33 128

(51) Int. Cl.$^7$ .............................................. C08G 64/00
(52) U.S. Cl. .................... 528/196; 428/64; 502/150; 528/198

(58) Field of Search ................................ 528/196, 198; 428/64; 502/150

(56) References Cited

U.S. PATENT DOCUMENTS

| | | | |
|---|---|---|---|
| 4,608,430 A | 8/1986 | Mark et al. .................. | 528/196 |
| 5,151,491 A | 9/1992 | Sakashita et al. ........... | 528/199 |
| 5,276,129 A | 1/1994 | Sakashita et al. ........... | 528/198 |
| 5,373,082 A | * 12/1994 | Kauth et al. ................. | 528/196 |
| 5,922,826 A | * 7/1999 | Kuze et al. .................. | 528/196 |

FOREIGN PATENT DOCUMENTS

| | | |
|---|---|---|
| EP | 0 337 207 | 10/1989 |
| EP | 0 685 503 | 12/1995 |

* cited by examiner

*Primary Examiner*—Terressa Boykin
(74) *Attorney, Agent, or Firm*—Joseph C. Gil; James R. Franks; Aron Preis

(57) ABSTRACT

The invention relates to a novel polycarbonate and its use a material in the production of molded articles and semifinished products, especially for transparent articles such as data memories or radio compact discs, slabs, cellular sheets, films, housings, panes, especially panes for motor vehicles, diffusion glasses, but also for electrical applications or the constructions of houses.

10 Claims, No Drawings

POLYCARBONATE AND MOLDED POLYCARBONATE ARTICLES

The present invention relates to a novel polycarbonate and its use as a material for the production of moulded bodies and semi-finished products, especially for transparent applications, such as data stores or audio compact disks, sheets, multi-wall sheets, films, lamp housings, panes, especially panes for motor vehicles, headlamp lenses, but also for electrical applications or house building.

The preparation of aromatic polycarbonates by the melt transesterification process is known from the literature and is described, for example, in the Encyclopedia of Polymer Science, Vol. 10 (1969), Chemistry and Physics of Polycarbonates, Polymer, Reviews, H. Schnell, Vol. 9, John Wiley and Sons, Inc. (1964) and, starting from DE 1 031 512, in some patents.

In EP-B-360 578 there are described polycarbonates containing, end groups other than phenol. The polycarbonates obtained according to EP 360 578 have a markedly increased content of erroneous structures as compared with the polycarbonates synthesised in solution. As the result, such materials have disadvantages as regards melt stability, thermostability and constancy of colour.

The object was, therefore, to develop polycarbonates and a process for their objective preparation, having greater stability.

The object has been achieved by the synthesis of polycarboriates having a markedly reduced concentration of erroneous structures.

The present invention provides solvent-free, low-branching, thermoplastic, aromatic polycarbonates prepared by the transesterification process and having weight-average molecular weights $M_w$ of from 2000 to 150,000, preferably from 4500 to 55,000, based on diphenols, chain terminators of formula (I)

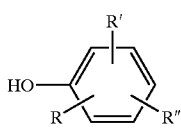

(I)

wherein R, R' and R" may each independently of the others represent H, optionally branched $C_1$-$C_{34}$-alkyl/cycloalkyl, $C_7$-$C_{34}$-alkaryl or $C_6$-$C_{34}$-aryl, and, optionally, branching agents, characterised in that structural elements of formula (II)

HO—Z(COOH)—OH  (II)

have a value after total saponification and HPLC determination of less than 300 ppm, preferably from 0.03 ppm to 250 ppm, Z being as defined for formula (VI) and the acid group being in the or the position relative to a hydroxy group.

As compared with polycarbonates mis-structured in the usual manner, the polycarbonates according to the invention exhibit a substantially increased hydrolytic stability and an improved critical thickness, with otherwise comparable mechanical and thermal properties.

The polycarbonates according to the invention are prepared in the melt from dihydroxy compounds, dicarbonates, chain terminators and, optionally, branching agents.

Chain terminators within the context of the invention are those of formula (I)

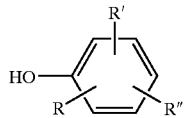

(I)

wherein R, R' and R" may each independently of the others represent H, optionally branched $C_1$-$C_{34}$-alkylcycloalkyl, $C_7$-$C_{34}$-alkaryl or $C_6$-$C_{34}$-aryl, for example o-n-butylphenol, m-n-butylphenol, p-n-butylphenol,
o-isobutylphenol, m-isobutylphenol, p-isobutylphenol,
o-tert-butylphenol, m-tert-butylphenol, p-tert-butylphenol,
o-n-pentylphenol, m-n-pentylphenol, p-n-pentylphenol,
o-n-hexylphenol, m-n-hexylphenol, p-n-hexylphenol,
o-cyclohexylphenol, m-cyclohexylphenol, p-cyclohexylphenol,
o-phenylphenol, m-phenylphenol, p-phenylphenol,
o-isooctylphenol, m-isooctylphenol, p-isooctylphenol,
o-n-nonylphenol, m-n-nonylphenol, p-n-nonylphenol,
o-cumylphenol, m-cumylphenol, p-cumylphenol,
o-naphthylphenol, m-naphthylphenol, p-naphthylphenol,
2,5-di-tert-butylphenol, 2,4-di-tert-butylphenol, 3,5-di-tert-butylphenol,
2,5-dicumylphenol, 3,5-dicumylphenol,
4-phernoxyphenol, 2-phenoxyphenol, 3-phenoxyphenol,
3-pentadecylphenol, 2-pentadecylphenol, 4-pentadecylphenol,
2-phenylphenol, 3-phenylphenol, 4-phenylphenol,
tritylphenol, 3-triphenylmethylphenol, 2-triphenylmethylphenol,
also benzotriazole derivatives of the general formula (III)

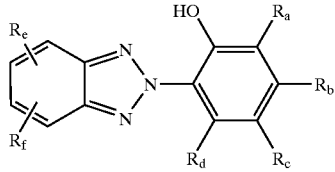

(III)

wherein $R_a$ to $R_f$ are as defined above for R, R'and R", and chroman compounds such as

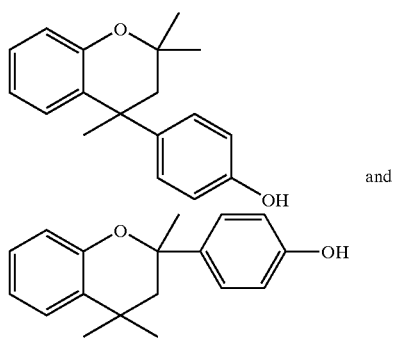

and preferably high-boiling phenols such as tritylphenol, cumylphenol, pentadecylphenol or chromans,
or also in the form of compounds that are capable of transesterification under the synthesis conditions, such as, for example, carbonates, oxalates; o-carboxylic acid esters or the like, with preference being given to the free phenols or the carbonic acid diesters of formula (IV)

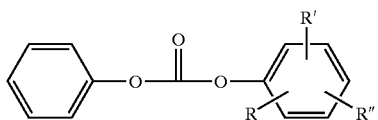

and formula (V)

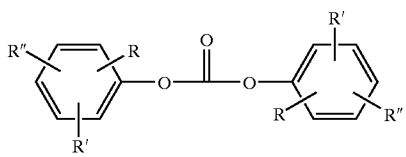

wherein R, R' and R" correspond to those of formula (I). Phenols or transesterification-active substances can be added to the synthesis individually or in the form of a mixture. Preferred mixtures are those with diphenyl carbonate. It is possible to add the phenol or the phenol-carrying compound at any time during the reaction, preferably at the beginning of the reaction, and the addition can be divided into several portions. The total amount of carbonic acid ester is from 100 to 130 mol %, preferably from 103 to 120 mol %, based on the dihydroxy compound.

For the preparation of polycarbonates by the process according to the invention it is possible to use a chain terminator or a mixture of several chain terminators, so that there may be present as an end group in the polycarbonate according to the invention phenol but also phenol together with other chain terminators. From 0.4 to 17 mol %, particularly preferably from 1.3 to 8.6 mol % (based on the dihydroxy compound), of chain terminator are preferably added. The addition may take place either before the reaction or wholly or partially during the reaction.

Dihydroxy compounds within the context of the invention are those of formula (VI)

HO—Z—OH (VI)

in which Z is an aromatic radical having from 6 to 30 carbon atoms which may contain one or more aromatic nuclei, may be substituted and may contain aliphatic or cycloaliphatic radicals or alkylaryls or hetero atoms as bridge members.

Examples of dihydroxy compounds of formula (VI) are
hydroquinone,
resorcinol,
dihydroxydiphenyls,
bis-(hydroxyphenyl)-alkanes,
bis-(hydroxyphenyl)-cycloalkanes,
bis-(hydroxyphenyl) sulfides,
bis-(hydroxyphenyl) ethers,
bis-(hydroxyphenyl) ketones,
bis-(hydroxyphenyl)-sulfones,
bis-(hydroxyphenyl) sulfoxides, αα'-bis-(hydroxyphenyl)-diisopropylbenzenes and their nuclear-alkylated and nuclear-hydrogenated compounds.

These and other suitable diphenols are described, for example, in U.S. Pat. Nos. 3,028,365, 3,148,172, 3,275,601, 2,991,273, 3,271,367, 3,062,781, 2,970,131 and 2,999,846, in German Offenlegungsschrift 1,570,703, 2,063,050, 2,063, 052, 2,211 0956, in French Patent Specification 1 561 518 and in the monograph "H. Schnell, Chemistry and Physics of Polycarbonates, Interscience Publishers, New York 1964".

Examples of preferred diphenols are:
4,4'-dihydroxydiphenyl,
2,2-bis-(4-hydroxyphenyl)propane,
2,4-bis-(4-hydroxyphenyl)-2-methylbutane,
1,1-bis4-hydroxyphenyl)cyclohexane,
1,1-bis-(4-hydroxyphenyl)4-methyicyclohexane,
α,α'-bis-(4-hydroxyphenyl)-p-diisopropylbenzene,
α,α-bis-(4-hydroxyphenyl)-m-diisopropylbenzene,
bis-(4-hydroxyphenyl)sulfone,
bis-(4-hydroxyphenyl)methane,
1,1-bis-(4-hydroxyphenyl)-3,3,5-trimethylcyclohexane,
2,2-bis-(2,6dimethyl-4-hydroxyphenyl)propane,
2,2-bis-(4-hydroxyphenyl)hexafluoropropane,
1,1-(4-hydroxyphenyl)- 1-phenylethane,
bis-(4-hydroxyphenyl)diphenylmethane,
dihydroxydiphenyl ether,
4,4'-thiobisphenol,
1,1-bis-(4-hydroxyphenyl)-1-(1-naphthyl)ethane,
1,1-bis-(4-hydroxyphenyl)-1-(2-naphthyl)ethane,
2,3-dihydroxy-3-(4-hydroxyphenyl)-1,1,3-trimethyl-1H-inden-5-ol,
2,3-dihydroxy-1-(4-hydroxyphenyl)-1,3,3-trimethyl-1-H-inden-5-ol, 2,2'3,3'-tetrahydro-3,3,3'3'-tetramethyl-1,1'spirobi[1H-indene]-5,5's-diol.

Special-preference is given to resorcinol,
1,1-bis-(4-hydroxyphenyl)-1-(1-naphthyl)ethane,
1,1-bis-(4-hydroxyphenyl)-1-(2-naphthyl)ethane,
2,2-bis-(4-hydroxyphenyl)propane, α,α'-bis-(4-hydroxyphenyl)-p-diisopropylbenzene,
α,α'-bis-(4-hydroxyphenyl)-m-diisopropylbenzene,
1,1-bis-(4-hydroxyphenyl)cyclohexane,
1,1-bis-(4-hydroxyphenyl)-3,3,5-trimethylcyclohexane,
bis-(4-hydroxyphenyl)diphenylmethane,
4,4'-dihydroxydiphenyl.

It is possible to use both one diphenol of formula (VI), with formation of homo-polycarbonates, and several diphenols of formula (VI), with formation of copolycarbonates.

Low-branching within the context of the invention means that the content of formula (II) in the polycarbonate has a value after total saponification and HPLC determination of less than 300 ppm, preferably from 0.03 ppm to 250 ppm.

The polycarbonates can be branched in a deliberate and controlled manner by the use of small amounts of from 0.02 to 3.6 mol % (based on the dihydroxy compound) of branching agents. Suitable branching agents are the compounds which are suitable for the preparation of polycarbonates and contain three or more functional groups, preferably those containing three or more than three phenolic OH groups.

Examples of suitable branching agents are phloroglucinol,
4,6-dimethyl-2,4,6-tri-(4-hydroxyphenyl)heptane,
1,3,5-tri-(4hydroxyphenyl)benzene,
1,1,1-tri-(4-hydroxyphenyl)ethane,
tri-(4-hydroxyphenyl)phenylmethane,
2,2-bis-[4,4-bis(4-hydroxyphenyl)cyclohexyl]propane,
2,4-bis-(4-hydroxyphenyl-isopropyl)phenol, 2,6-bis-(2-hydroxy-5-methylbenzyl)-4-methylphenol, 2-(4-hydroxyphenyl)-2-(2,4dihydroxyphenyl)propane, hexa-[4(4-hydroxyphenyl-isopropyl)phenyl] orthoterephthalic acid ester, tetra-(4-hydroxyphenyl)methane, tetra-[4-(4-hydroxyphenyl-isopropyl)phenoxy]methane, 4-bis-[4',4"-dihydroxytriphenyl)methyl]benzene, α,α',α"tris-(4-hydroxyphenyl)-1,3,4-triisopropenylbenzene, isatinbiscresol, pentaerythritol, 2,4-dihydroxybenzoic acid, trimesic acid, cyanuric acid.

1,1,1-tri-(4-hydroxyphenyl)ethane and isatinbiscresol are particularly preferred.

As catalyst for the preparation of the polycarbonates according to the invention there may be used phosphonium salts, optionally in combination with other suitable catalysts which do not lead to erroneous structures such as formula (II), such as, for example, other onium compounds.

Phosphonium salts within the context of the invention are those of formula (VII)

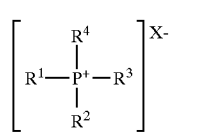

(VII)

wherein $R^{1-4}$ may be the same or different $C_1$-$C_{18}$-alkyls, $C_6$-$C_{14}$-aryls, $C_7$-$C_{12}$-aralkyls or $C_5$-$C_6$-cycloalkyls, preferably methyl or $C_6$-$C_{14}$-aryls, particularly preferably methyl or phenyl, and X– may be an anion, such as a sulfate, hydrogen sulfate, hydrogen carbonate, carbonate, acetate, boranate, hydrogen phosphates, a halide, preferably a fluoride, chloride or bromide, or an alcoholate of the formula OR wherein R may be $C_6$-$C_{14}$-aryl or $C_7$-$C_{12}$-aralkyl, preferably phenyl.

Preferred catalysts are tetraphenylphosphonium fluoride, tetraphenylphosphonium tetraphenylboranate, particularly preferably tetraphenylphosphonium phenolate.

The preparation of the polycarbonates according to the invention is carried out, for example, as follows: in the first step, the diphenols, the carbonic acid diesters, the catalyst and, optionally, the alkylphenols and branching agents are melted at temperatures of from 75° C. to 225° C., preferably from 105° C. to 235° C., particularly preferably from 120° C. to 190° C., under normal pressure within a period of from 0.1 to 5 hours, preferably from 0.25 to 3 hours. Then the oligocarbonate is prepared by applying a vacuum and raising the temperature by removing the monophenol by distillation. In the last step, the polycarbonate is prepared in the polycondensation by raising the temperature further to from 240° C. to 325° C. and at a pressure of <2 mbar.

In the preparation of polycarbonates by the melt transesterification process, the reaction of the bisphenol and the carbonic acid diester may be carried out continuously or discontinuously, for example, in stirrer vessels, thin-layer evaporators, falling film evaporators, stirrer vessel cascades, extruders, kneaders, simple disk reactors and high-viscosity disk reactors.

solation of the polycarbonates according to the invention is likewise carried out in a known manner, for example by removing, spinning and granulating.

The polycarbonates according to the invention can have weight-average molecular weights $M_w$ of approximately from 2000 to 150,000, preferably approximately from 4500 to 55,000, $M_w$ being determined via the relative solution viscosity in dichloromethane or in mixtures of equal amounts by weight of phenol/o-dichlorobenzene, calibration being by means of light scattering.

The polycarbonates according to the invention have the usual OH end group contents known from the literature, which can be determined by photometry using titanium tetrachloride.

The polycarbonates according to the invention can be processed thermoplastically in the usual manner at temperatures of from 260° C. to 320° C. Moulded bodies and films of any kind can be produced in a known manner by injection moulding or by means of extrusion.

The polycarbonates according to the invention are readily soluble in solvents such as chlorinated hydrocarbons, for example methylene chloride, and can therefore be processed, for example, in a known manner to cast films.

Accordingly, the invention also provides a process for the preparation of the low-branching polycarbonates according to the invention, characterised in that there are used as catalyst phosphonium salts of formula (VDI) in concentrations of from $10^{-2}$ mol to $10^{-6}$ mol, based on 1 mol of diphenol, optionally in combination with other suitable catalysts which do not lead to erroneous structures such as formula (II), such as, for example, other onium compounds.

In order to improve the properties, auxiliary substances and reinforcing agents can be added to the polycarbonates according to the invention. The following, inter alia, are to be taken into consideration as such: stabilisers, flow auxiliaries, mould-release agents, fireproofing agents, pigments, finely divided minerals, fibrous materials, for example alkyl and aryl phosphites, phosphates and phosphanes, low-molecular-weight carboxylic acid esters, halogen compounds, salts, chalk, quartz powder, glass and carbon fibres, pigments and combinations thereof.

Other polymers, for example polyolefins, polyurethanes, polyesters and polystyrene, may also be added to the polycarbonates according to the invention.

Excellent properties are achieved with that material even in moulded bodies.

Accordingly, the present invention relates also to the use of the low-branching, solvent-free, aromatic polycarbonates according to the inventionfor the production of moulded bodies and semi-finished products, especially for transparent applications, such as data stores or audio compact disks, sheets, multi-wall sheets, films, lamp housings, panes, especially panes for motor vehicles, headlamp lenses, but also for electrical applications or house building.

EXAMPLES

Comparison Example 1

45.60 g (0.2 mol) of bisphenol A, 47.08 g (110 mol %, based on bisphenol A) of diphenyl carbonate, 3.7 mg (0.03 mol %, based on bisphenol A) of boric acid and 2.12 g (5 mol %, based on bisphenol A) of 4-cumylphenol are weighed into a 500 ml three-necked flask equipped with a stirrer, an internal thermometer and a Vigreux column (30 cm, mirrored) with a bridge. The apparatus is freed of atmospheric oxygen by applying a vacuum and flushing with nitrogen (three times) and the mixture is melted at 180° C.

and stirred for 30 minutes. Then 36 5 mg (0.03 mol %, based on bisphenol A) of a 15% ammonium hydroxide solution and 0.5 mg (0.003 mol %, based on bisphenol A) of sodium hydrogen carbonate are added and stirring is continued for a further 30 minutes. The temperature is raised to 210° C. and the vacuum is increased to 200 mbar and the phenol that forms is removed by distillation. After one hour, the temperature is raised to 240° C. and after 20 minutes the vacuum is reduced to 150 mbar. After a further 20 minutes, the pressure is lowered to 100 mbar and maintained for 20 minutes. Then the pressure is reduced to 15 mbar for 30 minutes. The temperature is then raised to 270° C., the vacuum is reduced to 0.5 mbar and stirring is carried out for a further 2 hours. The results are summarised in Table 1.

Example 1

As Comparison Example 1, but 4.9 mg (0.004 mol %, based on bisphenol A) of tetraphenylphosphonium phenolate (which is metered in in the form of mixed crystal containing 30 wt. .% phenol, based on the mixed crystal) are added instead of tetramethylammonium hydroxide. Sodium hydrogen carbonate and boric acid are not added. The results are summarised in Table 1.

Example 2

45.66 g (0.2 mol) of bisphenol A, 47.13 g (110 mol %, based on bisphenol A) of diphenyl carbonate, 4.9 mg (0.004 mol %, based on bisphenol A) of tetraphenylphosphonium phenolate (which is metered in in the form of mixed crystal containing 30 wt. % phenol, based on the mixed crystal) and 2.12 g (5 mol %, based on bisphenol A) of 4-cumylphenol are weighed into a 500 ml three-necked flask equipped with a stirrer, an internal thermometer and a Vigreux column (30 cm, mirrored) with a bridge. The apparatus is freed of atmospheric oxygen by applying a vacuum and flushing with nitrogen (three times) and the mixture is melted at 150° C. The temperature is raised to 190° C. and the vacuum is increased to 100 mbar and the phenol that forms is removed by distillation. After 20 minutes, the temperature is raised to 235° C. and the vacuum is reduced to 60 mbar. After 15 minutes, the temperature is raised to 250° C. and after, a farther 15 minutes the vacuum is increased to 5 mbar. The mixture is then heated to 280° C. and the pressure is reduced to 0.5 mbar after 15 minutes. After a further 15 minutes, the mixture is stirred at 300° C. for a further 30 minutes. The results are summarsed in Table 1.

Example 3

45.66 g (0.2 mol) of bisphenol A, 47.13 g (110 mol %, based on bisphenol A) of diphenyl carbonate, 4.9 mg (0.004 mol %, based on bisphenol A) of tetraphenylphosphonium phenolate (which is metered in in the form of mixed crystal containing 30 wt. % phenol, based on the mixed crystal) and 3.05 g (5 mol %, based on bisphenol A) of 3-pentadecylphenol are weighed into a 500 ml three-necked flask equipped with a stirrer, an internal thermometer and a Vigreux column (30 cm, mirrored) with a bridge. The apparatus is freed of atmospheric oxygen by applying a vacuum and flushing with nitrogen (three times) and the mixture is melted at 150° C. The temperature is raised to 190° C. and the vacuum is increased to 100 mbar and the phenol that forms is removed by distillation. After 30 minutes, the temperature is raised to 235° C., and after a further 30 minutes it is increased to 300° C. The vacuum is slowly reduced to 0.5 mbar and the mixture is stirred for a further 30 minutes. The results are summarised in Table 1.

Example 4

1141.47 g (5 mol) of bisphenol A, ;1113.94 g (104 mol %, based on bisphenol A):of diphenyl carbonate and 122.5 mg (0.004 mol %, based on bisphenol A) of tetraphenylphosphonium phenolate (which is metered in in the form of mixed crystal containing 30 wt. % phenol, based on the mixed crystal) are weighed into a stirred container. The container is freed of atmospheric oxygen by applying a vacuum and flushing with nitrogen (three times) and the mixture is melted at 150° C. The temperature is raised to 190° C. and the vacuum is increased to 100 mbar and the phenol that forms is removed by distillation. After 60 minutes, the temperature is raised to 235° C., and after a further 30 minutes the vacuum is slowly reduced to 60 mbar and stirring is carried out for a further 15 minutes. The mixture is then heated tol to 250° C. and after, 15 minutes the pressure is lowered to 5 mbar for a short time. The results are summarised in Table 1.

TABLE 1

| | Chain terminator | Formula (II) [ppm] | Solution viscosity |
| --- | --- | --- | --- |
| Comparison Example 1 | cumylphenol/phenol | 303 | 1.142 |
| Example 1 | cumylphenol/phenol | 70 | 1.160 |
| Example 2 | cumylphenol/phenol | 25 | 1.122 |
| Example 3 | pentadecylphenol/phenol | 86 | 1.161 |
| Example 4 | phenol | 12 | 1.124 |

What is claimed is:

1. A solvent-free low-branching, thermoplastic, aromatic polycarbonate having a weight-average molecular weight ($M_w$) of from 2000 to 150,000, and being prepared by melt transesterification of a composition comprising, (i) diphenols, (ii) chain terminators of formula (I)

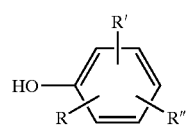

(I)

wherein R, R' and R" each independently of the others represent H, optionally branched $C_1$-$C_{34}$-alkyl/cycloalkyl, $C_7C_{34}$-alkaryl or $C_6$-$C_{34}$-aryl, and, (iii) optionally branching agents, wherein the transesterification process is performed in the presence of a catalyst represented by the following formula

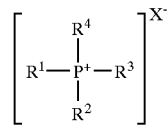

for which $R^1$, $R^2$, $R^3$ and $R^4$ are each independently selected from the group consisting of $C_1$-$C_{18}$-aryl, $C_6$-$C_{14}$-aryl, $C_7$-$C_{12}$-aralkyl and $C_5$-$C_6$cycloalkyl, and X– is an anion selected from the group consisting of sulfate, hydrogen sulfate, hydrogen carbonate, carbonate, acetate, boranate, hydrogen phosphate, halide, and an alcoholate of the formula $OR^5$ wherein $R^5$ is selected from $C_6$-$C_{14}$-aryl and $C_7$-$C_{12}$-aralkyl, and further wherein after total saponification the aromatic polycarbonate contains less than 300 ppm, determined by HPLC, of elements conforming to formula (II)

$$HO—Z(COOH)—OH \qquad (II)$$

wherein Z is an aromatic radical having 6 to 30 carbon atoms and where the acid group is in the ortho position relative to a hydroxy group.

2. The polycarbonate of claim 1 wherein the end groups consist of alkylphenol end groups to the extent of more than 30% of the reacted end groups.

3. The polycarbonate according to claim 1 wherein said elements are present in an amount of from 0.03 ppm to 250 ppm.

4. A process for the preparation of the low-branching polycarbonates comprising melt transesterifying a composition of, (i) diphenols, (ii) chain terminators of formula (I)

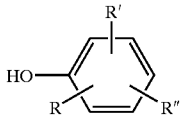

(I)

wherein R, R' and R" each independently of the others represent H, optionally branched $C_1$-$C_{34}$-alkyl/cycloalkyl, $C_7$-$C_{34}$-alkaryl or $C_6$-$C_{34}$-aryl, and (iii) optionally branching agents, in the presence of (iv) a catalyst represented by the following formula

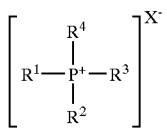

for which $R^1$, $R^2$, $R^3$ and $R^4$ are each independently selected from the group consisting of $C_1$-$C_{18}$-alkyl, $C_6$-$C_{14}$-aryl, $C_7$-$C_{12}$-aralkyl and $C_5$-$C_6$-cycloalkyl, and $X^{31}$ is an anion selected from the group consisting of sulfate, hydrogen sulfate, hydrogen carbonate, carbonate, acetate, boranate, hydrogen phosphate, halide, and an alcoholate of the formula $OR^5$ wherein $R^5$ is selected from $C_6$-$C_{14}$-aryl and $C_7$-$C_{12}$-aralkyl, wherein after total saponification the aromatic polycarbonate contains less than 300 ppm, determined by HPLC, of elements conforming to formula (II)

$$HO—Z(COOH)—OH \qquad (II)$$

wherein Z is an aromatic radical having 6 to 30 carbon atoms and where the, acid group is in the ortho position relative to a hydroxy group.

5. The process of claim 4 wherein the catalyst is used in concentrations of from $10^{-2}$ mol to $10^{-6}$ mol, based on 1 mol of diphenol.

6. The process according to claim 4 wherein the catalyst is tetraphenylphosphonium phenolate.

7. A molded article comprising the polycarbonate of claim 1.

8. The molded article of claim 7 wherein the molded article is transparent.

9. The molded article of claim 7 selected from the group consisting of data stores, audio compact disks, sheets, multi-wall sheets, films, lamp housings, panes, headlamp lenses, and structural elements.

10. The polycarbonate of claim 1 wherein the catalyst is tetraphnylphosphonium phenolate.

* * * * *

UNITED STATES PATENT AND TRADEMARK OFFICE
CERTIFICATE OF CORRECTION

PATENT NO. : 6,740,730 B1
DATED : May 25, 2004
INVENTOR(S) : Silke Kratschmer, Uwe Hucks and Lothar Bunzel It is certified that error appears in the above-identified patent and that said Letters Patent is hereby corrected as shown below:

Column 8,
Line 48, delete "$C_7C_{34}$-alkaryl" and insert -- $C_7C_{34}$-alkaryl --.
Line 64, delete ""$C_1C_{18}$-aryl" and insert -- $C_1C_{18}$-alkyl --.
Line 65, delete "X-" and insert -- $X^-$ --.

Column 9,
Line 24, delete "preparation of the" and insert -- preparation of a --.
Line 25, delete "polycarbonates" and insert -- polycarbonate --.

Column 10,
Line 15, delete "$X^{31}$" and insert -- $X^-$ --.
Line 26, delete "and where the," and insert -- and where the --.

Signed and Sealed this

Sixteenth Day of November, 2004

JON W. DUDAS
*Director of the United States Patent and Trademark Office*